3,646,026
PHENYL N-METHYL CARBAMATES
Erwin Nikles, Liestal, and Ladislaus Pinter, Basel, Switzerland, assignors to Ciba Limited, Basel, Switzerland
No Drawing. Filed Aug. 28, 1967, Ser. No. 663,509
Claims priority, application Switzerland, Sept. 2, 1966, 12,785/66
Int. Cl. C07d 87/36, 87/42
U.S. Cl. 260—247.2 B  4 Claims

ABSTRACT OF THE DISCLOSURE

The invention relates to carbamates of general formula

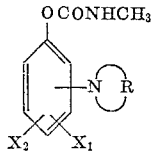

wherein R represents an alkylene or alkenylene residue containing 4 or 5 carbon atoms which may be interrupted by an oxygen atom and which may be substituted by lower alkyl groups, and $X_1$ and $X_2$ may be identical or different and represent a hydrogen atom, a halogen atom or a lower alkyl group with the proviso that simultaneously there must not be present two of the substituents in the ortho position to the carbamoyloxy residue, and their salts with inorganic and organic acids, and pesticidal preparations containing such carbamates, as active ingredients, together with a suitable carrier.

The present invention relates to new carbamates, processes for their manufacture and pesticidal preparations which contain such carbamates.

The new carbamates are represented by the following general formula:

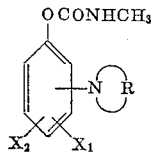

wherein R represents an alkylene or alkenylene residue which contains 4 or 5 carbon atoms and may be interrupted by an oxygen atom and which may be substituted by lower alkyl groups, and $X_1$ and $X_2$ may be identical or different and represent hydrogen, halogen or lower alkyl groups, with the proviso that there must not simultaneously be present two of the substituents in the ortho-position to the carbamoyloxy residue. The term "alkenylene residue" as used herein is to be understood as including bivalent aliphatic hydrocarbon residues having two conjugated double bonds.

The invention also provides the acid addition salts of the carbamates of the invention with inorganic or organic acids.

Examples of possible inorganic acids for salt formation are the following: sulphuric acid, hydrochloric acid, hydrobromic acid, nitric acid, sulphamic acid or phosphoric acid. Examples of possible organic acids for salt formation are the following: methanesulphonic acid, chloromethanesulphonic acid, ethionic acid, benzoic acid, succinic acid and maleic acid.

The invention especially provides carbamates of general formula

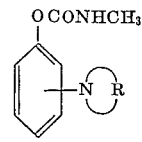

wherein R represents an alkylene or alkenylene residue which contains 4 or 5 carbon atoms and may be interrupted by an oxygen atom, and which may be substituted by lower alkyl groups.

Carbamates having especially good insecticidal properties are those of general formula:

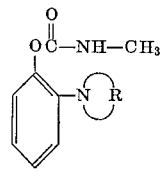

wherein R represents an alkylene or alkenylene residue containing 4 or 5 carbon atoms which may be interrupted by an oxygen atom and which may be substituted by lower alkyl groups.

Carbamates having the general formula

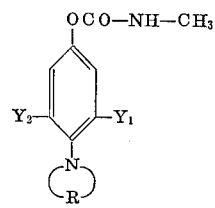

wherein R represents an alkylene or alkenylene residue containing 4 or 5 carbon atoms which may be interrupted by an oxygen atom and which may be substituted by lower alkyl groups, and $Y_1$ represents a hydrogen atom or a lower alkyl group and $Y_2$ represents a lower alkyl group, as well as their acid addition salts with inorganic or organic acids, are distinguished by the fact that they possess an especially broad spectrum of effectiveness.

The carbamates of the invention have interesting biocidal, especially insecticidal and acaricidal properties. Furthermore, these carbamates also act as herbicides, bactericides, fungicides and molluscicides.

The new carbamates of Formula I may be manufactured by reacting a phenol of formula

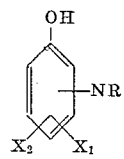  (II)

with a reactive derivative of carbonic acid and methylamine.

The reaction of the phenol II with a reactive derivative of carbonic acid and methylamine can take place in optional sequence, except that this sequence depends somewhat on the structure of the final product.

In accordance with the process, it is for example possible to react a phenol II or an alkali salt of such a phenol with phosgene and to react the resulting chlorocarbonate or carbonate with methylamine.

However, it is also possible to react the methylamine beforehand with the phosgene and to react the resulting carbamic acid chloride, or the methylisocyanate which is easily produced therefrom, with the phenol II. Furthermore it is possible to react a urethane derived from methylamine, preferably an alkylurethane, with a phenol of Formula II (transesterifications).

It is furthermore also possible to react a urea derived from methylamine with a phenol of Formula II, preferably at a raised temperature.

The phenols of Formula II are described in the literature. The residue R characterises them as o- or m-pyrrolidino-, pyrrolino-, pyrrolo-, piperidino-, morpholino-, thiomorpholino-, 3,5-dimethylmorpholino-, oxazolino- or oxazolino-phenols.

As already mentioned, the new carbamates of Formula I exhibit interesting biocidal properties. Thus, for example, these carbamates have a very strong effect on aphids, caterpillars and beetles. They are greatly superior to the known active substance "Carbaryl" (N-methyl-α-naphthyl-carbamate) as regards their contact effect.

The strong effects on *Phyllodromia germanica* and *Periplaneta americana* should be particularly stressed.

The new carbamates are therefore very suitable for combatting pests in the field of hygiene, in storage etc.

The present invention therefore also provides pesticidal preparations which comprise, as active substance, a carbamate of Formula I together with a carrier. There may also be present one or more of the following additives: a solid carrier, a solvent, a diluent, a dispersing agent, a wetting agent, an adhesive and a fertiliser as well as under certain circumstances, a further pesticide.

As a result of their broad biocidal effect the new materials have the particular advantage that they can be used for combatting a very large variety of vegetable and animal pests.

They are not only suitable as herbicides, but used at a concentration which does not allow any phytotoxic phenomena to manifest themselves they also show an outstanding effect against harmful microorganisms in plant protection, for example against fungi as well as against harmful insects, acarides, nematodes and their eggs of larvae.

Furthermore, the new materials are generally usable as microbiocides.

In order to manufacture directly sprayable solutions of the compounds of general Formula I, there may be used, for example, mineral oil, fractions of high to medium boiling range, for example, diesel oil or kerosene, coal tar oil and oils of vegetable or animal origin, as well as hydrocarbons, for example, alkylated naphthalenes or tetrahydronaphthalene, optionally with the use of xylene mixtures, cyclohexanols, ketones, and furthermore chlorinated hydrocarbons, for example, trichloroethane and tetrachlorethane, trichlorethylene or trichlorobenzenes and tetrachlorobenzenes. Advantageously, organic solvents whose boiling point is above 100° C. are used.

It is especially advantageous to prepare aqueous application forms from emulsion concentrates, pastes or wettable spraying powders by adding water. Possible emulsifying agents or dispersing agents are non-ionic products, for example, condensation products of aliphatic alcohols, amines or carboxylic acids having a long chain hydrocarbon residue of about 10 to 20 carbon atoms with ethylene oxide, for example, the condensation product of octadecyl alcohol and 25 to 30 mols of ethylene oxide, or that of technical oleylamine and 15 mols of ethylene oxide or that of dodecylmercaptan and 12 mols of ethylene oxide. As anionic emulsifiers which may be employed, there may be mentioned the sodium salt of dodecyl alcohol sulphuric acid ester, the sodium salt of dodecylbenzenesulphonic acid, the potassium or triethanolamine salt of oleic acid or of abietic acid or of mixtures of these acids, or the sodium salt of a petroleum-sulphonic acid. As cationic dispersing agents, there may be mentioned quaternary ammonium compounds, for example, cetyl pyridinium bromide or dihydroxyethyl benzyl dodecyl ammonium chloride.

As solid carriers substances for use in the manufacture of dusting and scattering agents, there may be mentioned talc, kaolin, bentonite, calcium carbonate, calcium phosphate, and also charcoal, cork powder, wood flour and other materials of vegetable origin. It is also very advantageous to manufacture the preparations in granular form. The various forms of the prepaartion can, in the usual manner, also contain additions of substances which improve the distribution, adhesion, rain resistance or penetrating power. Examples of such substances are: fatty acids, resins, glues, casein or alginates.

The materials of the invention may be used by themselves or together with conventional pesticides, especially insecticides, acaricides, nematocides, bactericides, fungicides, herbicides etc.

The following examples illustrate the invention:

EXAMPLE 1 o-(N-pyrrolidino)-phenyl-N-methyl-carbamate 57 parts of n-(N-pyrrolidino)-phenol are dissolved in 250 parts by volume of dry toluene and are mixed with 26 parts of methyl isocyanate. The reaction takes place with slight evolution of heat. The solution is allowed to stand for 1 day at room temperature, and is then evaporated in vacuo. The residue is crystallised from carbon tetrachloride. Melting point 105°–106° C. [active substance No. 1].

Acid sulphate.—6.6 parts of o-(N-pyrrolidino)-phenyl-N-methyl-carbamate are dissolved in 100 parts by volume of dioxane and are mixed with 3 parts of concentrated sulphuric acid in 30 parts by volume of dioxane. The resulting salt precipitates as an oil, which crystallises after some time. The crystals are filtered off, washed with dioxane and dried in vacuo. Melting point 129° C.

Other salts, such as for example, the hydrochloride, may also be manufactured analogously.

EXAMPLE 2 o-(2-methyl-N-pyrrolidino)-phenyl-N-methyl-carbamate 24 parts of o-(2-methyl-N-pyrrolidino)-phenol are mixed with 25 parts by volume of dry ether. 11 parts of methyl isocyanate are added thereto, a little at a time, whereupon the mixture begins to boil. The solution is kept at 40° C. for a further 24 hours, and is then evaporated in vacuo. The residue is freed of the last remnants of solvent at 50° C. in a high vacuum. 32 parts of o-(2-methyl-N-pyrrolidino)-phenyl-N-methylcarbamate are obtained as a viscous resin, [Active substance No. 2].

EXAMPLE 3 o-(2,5-dimethyl-N-pyrrolidino)-phenyl-N-methyl-carbamate 27 parts of o-(2,5-dimethyl-N-pyrrolidino)-phenol are mixed with 11 parts of methyl isocyanate. The temperature of the mixture is kept at 35–40° C. by occasionally immersing it in ice water. The product is kept at 40° C. for a further 24 hours and is thereafter freed of volatile constituents in a high vacuum. 36 parts of o-(2,5-dimethyl-N-pyrrolidino)-phenyl-N-methyl-carbamate are obtained as a viscous resin. [Active substance No. 3].

EXAMPLE 4 o-(N-morpholino)-phenyl-N-methyl-carbamate 30 parts of o-(N-morpholino)-phenol are dissolved in 300 parts by volume of dry methylene chloride and are mixed with 12 parts of methyl isocyanate. The solution is kept at 35° C. for 24 hours and is then mixed with 100 parts by volume of hexane. The crystalline product is filtered off and is recrystallised from methanol-water. Melting point 138°–140° C. [Active substance No. 4].

EXAMPLE 5 m-Methyl-p-(N-3-pyrrolino)-phenol

A mixture of 246 parts of p-amino-m-cresol, 276 parts of powered anhydrous potassium carbonate, 250 parts of cis-1,4-dichlorobutene and 1500 parts by volume of acetone is boiled for 3 days under reflux. The salts are filtered off and the filtrate is evaporated. The residue is slowly mixed with 500 parts of acetic anhydride and the mixture then boiled for half an hour under reflux. After evaporating the volatile constituents at 80° C. in a waterpump vacuum, the product is dissolved in 1500 parts by volume of chloroform. This solution is extracted three times with 500 parts by volume of 2 N hydrochloric acid. The combined extracts are mixed with a solution of 300 parts of sodium hydroxide in 1000 parts of water and stirred for 1 hour at 90° C. under nitrogen. The product precipitates, when neutralised to pH=8.5 by addition of hydrochloric acid. It is filtered off, washed with water and dried at 40° C. in a waterpump vacuum. Melting point 91° C.

m-Methyl-p-(N-3-pyrrolino)-phenyl-N-methyl-carbamate 44 parts of m-methyl-p-(N-3-pyrrolino)-phenol are suspended in 250 parts by volume of dry toluene and are gradually mixed with a total of 17 parts of methyl isocyanate. The temperature rises to 45° C. The solution is stirred for 1 day at 30° C. and is diluted with 1300 parts of petroleum ether and cooled to 10° C. The recrystallised product is filtered off. Matching point 99–96° C. [active substance No. 5].

EXAMPLE 6 m,m'-Dimethyl-p-(2,5-dimethyl-N-pyrrolo)-phenol

A mixture of 27.4 parts of p-amino-m,m'-dimethylphenol, 24 parts of acetonylacetone and 100 parts by volume of benzene is boiled in a circulatory distillation apparatus. When no more water separates out, the solution is evaporated.

m,m'-Dimethyl-p-(2,5-dimethyl-N-pyrrolo)-phenyl-N-methylcarbamate 24 parts of m,m'-dimethyl-p-(2,5-dimethyl-N-pyrrolo)-phenol and 0.3 parts of triethylene diamine are dissolved in 200 parts by volume of dry toluene and are mixed with a total of 9 parts of methyl isocyanate; by adding the latter drop by drop. The solution is kept for 16 hours at 35° C. and is then evaporated. The residue is crystallised from cyclohexane. Melting point 130–133° C. [Active substance No. 6]. The following carbamates and their salts may be manufactured analogously to the description in Examples 1–6:

(7) o-(N-3-pyrrolino)-phenyl-N-methyl-carbamate, melting point 129–130° C.
(8) o-(3-methyl-N-pyrrolidino)-phenyl - N - methyl-carbamate (resin).
(9) o-(3,4-dimethyl - N - pyrrolidino)-phenyl-N-methyl-carbamate (resin).
(10) m-(N-pyrrolidino)-phenyl - N - methyl-carbamate, melting point 85–86° C.
(11) o-(N-piperidino)-phenyl-N-methyl-carbamate
(12) m-(N-3-pyrrolino)-phenyl-N-methyl-carbamate
(13) m-Methyl-p-(2,5-dimethyl - N - pyrrolo)-phenyl-N-methyl-carbamate, melting point 105–107° C.
(14) m,m' - Dimethyl-p-(N-pyrrolidino)-phenyl-N-methyl-carbamate (crystallised from cyclohexane).
(15) m-Ethyl-m'-methyl - p - (N-pyrrolidino)-phenyl-N-methyl-carbamate.
(16) m,m' - Dimethyl-p-(N-3-pyrrolino)-phenyl-N-methyl-carbamate (crystallised from cyclohexane).

EXAMPLE 7

Dusting agents

Equal parts of one of the active substances Nos. 1–6 are mixed with precipitated silica and the mixture is finely ground. Dusting agents having the desired concentration of active substance can be manufactured therefrom by mixing with kaolin or talc. In general, preparations containing 1–5% of active substance are preferred.

Spraying powder

In order to manufacture a spraying powder the following components are, for example, mixed and finely ground:

50 parts of active substance No. 1, 2, 3 or 4
20 parts of Hisil (highly adsorbent precipitated silica)
25 parts of bolus (kaolin)
3.5 parts of a reaction product of p-tert.octylphenol and ethylene oxide
1.5 parts of sodium 1-benzyl-2-stearyl-benzimidazole-6,3'-disulphonate Emulsion concentrate Easily soluble active substances can also be formulated as emulsion concentrates according to the following prescription:

20 parts of active substance
70 parts of xylene
10 parts of a mixture of a reaction product of an alkylphenol with ethylene oxide and calcium dodecylbenzenesulphonate are mixed. On diluting to the desired concentration with water, a sprayable emulsion is porduced.

EXAMPLE 8

Active substance No. 1 was tested in a dust form on various pests.

After 24 hours exposure time the following results were obtained:

| Pest: | Limiting concentration (mg./m.²) for 100% mortality |
|---|---|
| *Phyllodromia germanica* | 12 |
| *Periplaneta americana* | 6 |
| *Blatta orientalis* | 50 |
| *Acheta domestica* | 50 |

EXAMPLE 9

Active substance No. 1 exhibits, in addition to the effects mentioned in Example No. 8, a good effect against plant-parasite neamatodes; the semi-sulphate of this active substance acts in the same manner.

Active substance No. 4 shows a good effect against Epilachna (Mexican bean beetle).

Active substances No. 5 and No. 7 show a good effect against Prodenia and Epilachna.

Active substance No. 6 is also distinguished by a good and long-lasting aphicidal effect and by a strong effect against Origya.

EXAMPLE 10

The compound of the formula

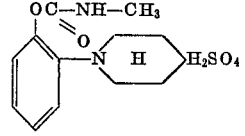

exhibits a very strong killing action against various orders of acarina.

The mortality rate is shown in the following table:

| | 100% kill, p.p.m. |
|---|---|
| *Rhipicephalus bursa* (adults) | 10 |
| *Boophilus microplus* (larvea) | 1 |
| *Dermanyssus gallinae* | 5 |

All other compounds of this invention show similar actions.

We claim:

1. A carbamate of the formula

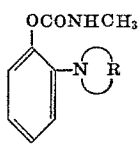

wherein

represents pyrrolidino which may be substituted with up to two methyl groups, or pyrrolino or acid addition salts of said carbamates.

2. The compound of claim 1 having the formula

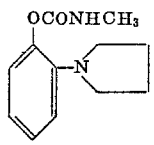

3. The compound of claim 1 having the formula

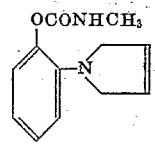

4. A carbamate having the formula

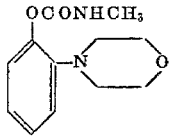

References Cited

UNITED STATES PATENTS 3,060,225 10/1962 Alexander _____ 260—479
3,304,303 2/1967 Schmidt et al. _____ 260—247.1
3,404,975 10/1968 Wilson et al. _____ 260—247.1

ALEX MAZEL, Primary Examiner

J. TOVAR, Assistant Examiner

U.S. Cl. X.R.

260—243 B, 247.1, 293.4 A, 294.3 B, 326.3; 424—274